Nov. 20, 1945. W. L. NANCE 2,389,320
TRUCK BRAKE
Filed June 14, 1944 2 Sheets-Sheet 2
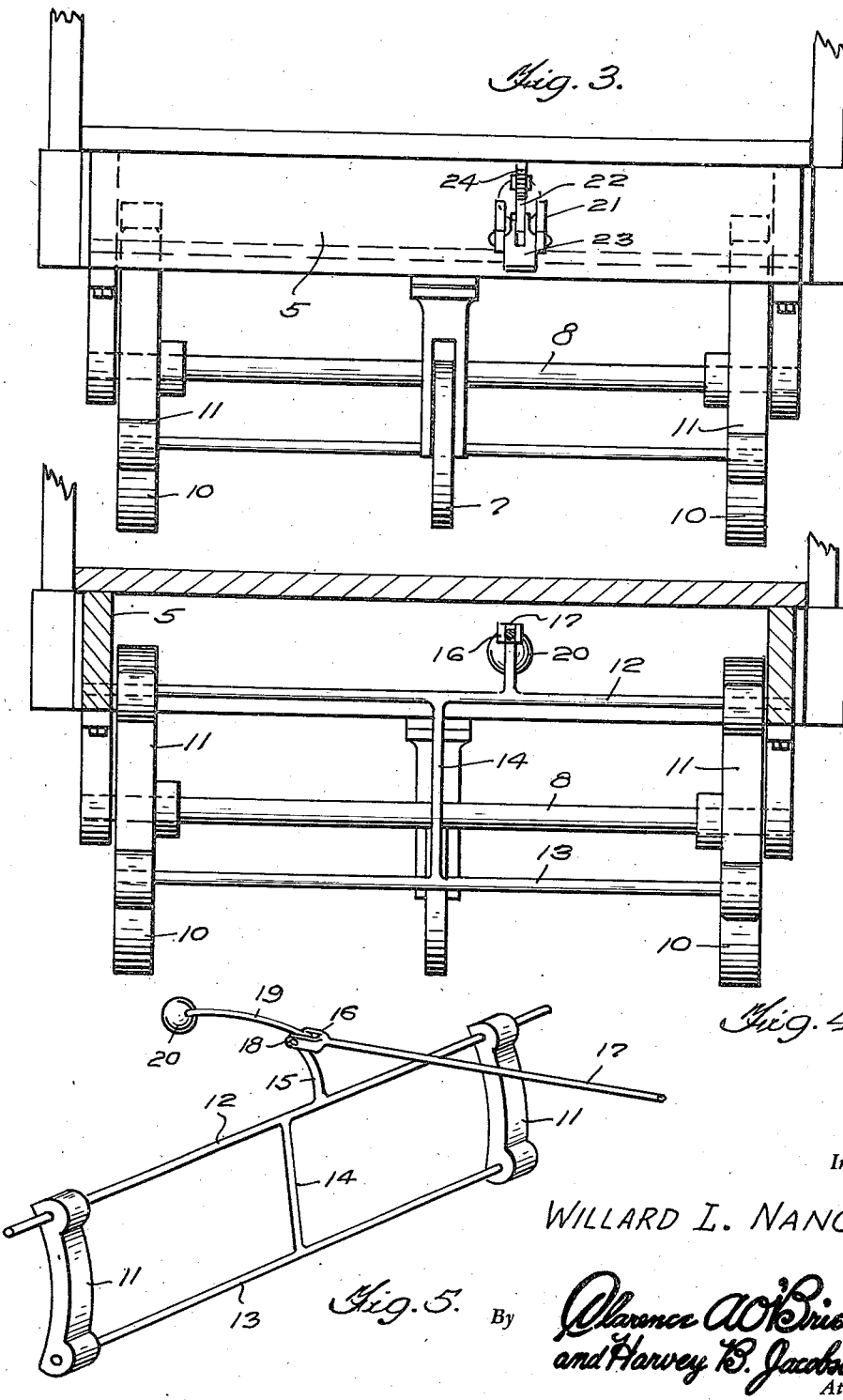
Inventor
WILLARD L. NANCE, Patented Nov. 20, 1945

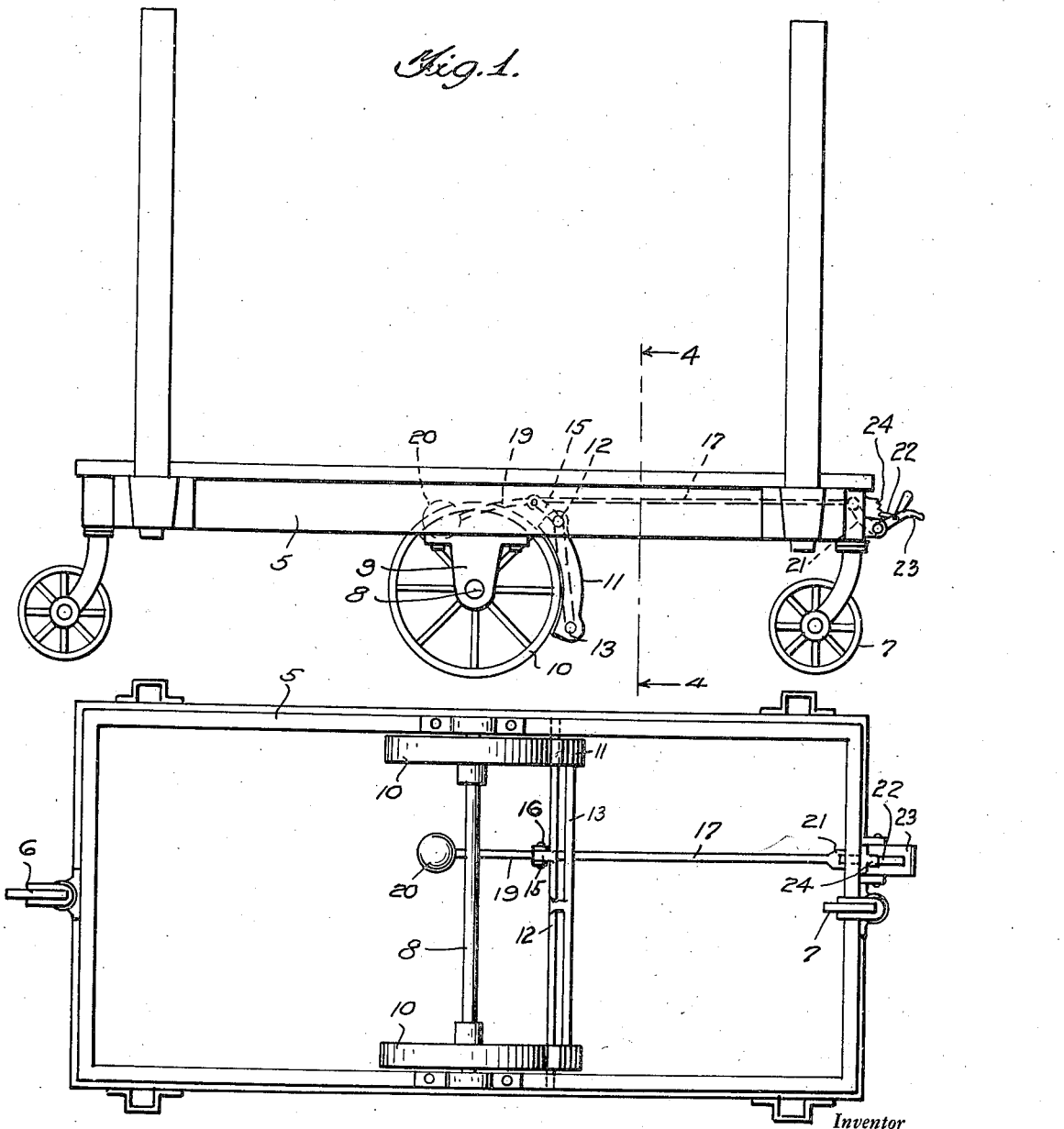

2,389,320

UNITED STATES PATENT OFFICE 2,389,320

TRUCK BRAKE

Willard L. Nance, Peoria, Ill.

Application June 14, 1944, Serial No. 540,339

1 Claim. (Cl. 188—21)

This invention relates to new and useful improvements in brakes especially adapted for use on hand trucks.

The principal object of the present invention is to provide a brake for hand trucks which can be used for snubbing the action of the truck, especially when loaded and going down-grade and to hold the trucks when loading and unloading.

Other objects and advantages of the invention will become apparent to the reader of the following description.

In the drawings:

Figure 1 is a side elevational view of the truck equipped with the improved brake mechanism.

Figure 2 is a top plan view of the truck with the platform removed.

Figure 3 is an end elevational view fragmentarily showing the truck and the detent for the brake.

Figure 4 is a fragmentary vertical sectional view taken on the line 4—4 of Figure 1.

Figure 5 is a perspective view fragmentarily showing the brake assembly.

Referring to the drawings wherein like numerals designate like parts, it can be seen that the truck is of the type consisting of a rectangular-shaped frame 5 preferably of angle iron construction and having small caster wheels 6, 7 at the front and rear ends thereof. This type of truck has a transverse axle 8 at its intermediate portion, preferably journaled in bearings 9 and at each end portion is a wheel 10.

In carrying out the present invention a pair of brake shoes 11, 11 are provided and these have upper and lower rods 12, 13, the upper rod 12 extending through the upper portions of the shoes 11 and the projecting end portions serving as trunnions disposed into bearings or recesses in the side portions of the frame 5. Thus, the brake assembly is swingably mounted. Preferably, the rods 12, 13 are connected by a brace bar or rod 14.

An arm 15 rises from the upper bar 12 and a yoke 16 on an elongated control rod 17 pivotally connects thereto as at 18. From the upper end of this arm 15 a second arm 19 projects and carries a counter-balance weight 20.

The rod 17 extends rearwardly and to the inner end of a rocker 21 where it is pivotally secured. The rocker carries a spring-pressed dog 22 having a foot lever 23 and being operative against a ratchet bar 24. Obviously, this pawl 22 can be set against the desired tooth of the ratchet bar 24 for applying the brake shoes 11 to the desired extent for snubbing the speed of the truck in descending grades, especially when the truck is loaded or for holding the truck while being loaded or unloaded.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a truck, a frame including side bars, a pair of side wheels supporting said frame, a pair of upstanding brake shoes for the wheels, a pair of rods connecting the upper and lower ends of said shoes, one rod having ends journaled in said side bars whereby said shoes are suspended for swinging into and from brake-applying position, an arm upstanding from said journaled rod, an operating rod pivoted at one end to said arm, a foot rocker pivoted on said frame and to which the other end of the operating rod is pivoted, and a detent for holding said rocker in different positions comprising a pawl on said rocker and a ratchet bar on said frame.

WILLARD L. NANCE.